US007432909B2

(12) United States Patent
Yamamoto et al.

(10) Patent No.: US 7,432,909 B2
(45) Date of Patent: Oct. 7, 2008

(54) COMMUNICATION SYSTEM, COMMUNICATION APPARATUS, AND COMMUNICATION METHOD

(75) Inventors: Takashi Yamamoto, Yamato (JP); Katsuhiro Miyamoto, Isehara (JP); Tetsu Fukuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 590 days.

(21) Appl. No.: 09/819,758

(22) Filed: Mar. 29, 2001

(65) Prior Publication Data
US 2001/0026386 A1 Oct. 4, 2001

(30) Foreign Application Priority Data
Mar. 30, 2000 (JP) .............................. 2000-093959

(51) Int. Cl.
*G09G 5/00* (2006.01)
(52) U.S. Cl. ........................ 345/158; 348/734; 345/156
(58) Field of Classification Search ......... 345/156–169, 345/781, 810–856, 716, 717; 348/734; 340/825.72, 340/825.25, 825.69, 825.73; 341/173–176; 463/37–38
See application file for complete search history.

(56) References Cited

U.S. PATENT DOCUMENTS

| 4,728,949 | A | * | 3/1988 | Platte et al. ............. 340/825.37 |
| 4,828,209 | A | * | 5/1989 | Niemi .................... 248/220.42 |
| 5,416,535 | A | * | 5/1995 | Sato et al. ................... 348/706 |
| 5,418,527 | A | * | 5/1995 | Yashiro .................. 340/825.24 |
| 5,450,079 | A | * | 9/1995 | Dunaway ....................... 341/23 |
| 5,500,794 | A | * | 3/1996 | Fujita et al. .................... 700/83 |
| 5,594,509 | A | * | 1/1997 | Florin et al. .................... 725/43 |
| 5,889,506 | A | * | 3/1999 | Lopresti et al. .............. 345/158 |
| 5,949,351 | A | * | 9/1999 | Hahm ................... 340/825.72 |
| 5,949,407 | A | * | 9/1999 | Sato ........................... 345/169 |
| 6,111,569 | A | * | 8/2000 | Brusky et al. ............... 715/717 |
| 6,313,812 | B1 | * | 11/2001 | Nagano et al. ............... 345/2.1 |
| 6,346,934 | B1 | * | 2/2002 | Wugofski .................... 345/158 |
| 6,400,280 | B1 | * | 6/2002 | Osakabe ................ 340/825.25 |
| 6,421,069 | B1 | * | 7/2002 | Ludtke et al. ............... 715/762 |
| 6,469,633 | B1 | * | 10/2002 | Wachter ................. 340/825.69 |
| 6,507,306 | B1 | * | 1/2003 | Griesau et al. .............. 341/176 |

* cited by examiner

*Primary Examiner*—Kent Chang
(74) *Attorney, Agent, or Firm*—Fitzpatrick, Cella, Harper & Scinto

(57) ABSTRACT

A control system includes a control apparatus and a remote control device. The control apparatus receives an operation panel from a controlled apparatus. The operation panel includes display elements used to control the controlled apparatus. The display elements include a specific display element used to control a specific function of the controlled apparatus. The remote control device has first and second operating units. The first operating unit is used to control the specific function of the controlled apparatus using the operation panel. The second operating unit is used to control the specific function of the controlled apparatus. The control apparatus receives a control signal from the remote control device, and generates one of a first command and a second command in accordance with the control signal. The first and second commands are used to control the specific function of the controlled apparatus.

12 Claims, 12 Drawing Sheets

FIG. 5

| ADDRESS OFFSET | VALUE | CONTENTS | |
|---|---|---|---|
| 00h | 80h | ELEMENT TYPE (PANEL) | |
| 01h | 00h | | |
| 02h | 00h | ELEMENT ID (ID=0) | |
| 03h | 00h | | |
| 04h | 00h | DATA LENGTH | |
| 05h | 00h | | |
| 06h | 00h | | |
| 07h | 52h | | |
| 08h | 80h | LABEL LINK | DATA TYPE (TEXT) |
| 09h | 0Ah | | |
| 0Ah | 00h | | ELEMENT ID (ID=11) |
| 0Bh | 05h | | |
| 0Ch | 01h | POSITION | THE NUMBER OF POSITION DESIGNATIONS |
| 0Dh | 00h | | X-COORDINATE 0 |
| 0Eh | 04h | | |
| 0Fh | 00h | | Y-COORDINATE 0 |
| 10h | 04h | | |
| 11h | 00h | | SYSTEM-OF-COORDINATES DESIGNATION 0 |
| 12h | 01h | SIZE | WIDTH |
| 13h | 68h | | |
| 14h | 00h | | HEIGHT |
| 15h | 78h | | |
| 16h | 80h | BUTTON LINK 1 | ELEMENT TYPE (BUTTON) |
| 17h | 04h | | |
| 18h | 00h | | ELEMENT ID (ID=1) |
| 19h | 01h | | |
| 1Ah | 80h | BUTTON LINK 2 | ELEMENT TYPE (BUTTON) |
| 2Bh | 04h | | |
| 2Ch | 00h | | ELEMENT ID (ID=2) |
| 2Dh | 02h | | |
| ... | ... | ... | ... |
| 26h | 80h | BUTTON LINK 5 | ELEMENT TYPE (BUTTON) |
| 27h | 04h | | |
| 28h | 00h | | ELEMENT ID (ID=5) |
| 29h | 05h | | |
| 2Ah | 80h | ANIMATION LINK 1 | ELEMENT TYPE (ANIMATION) |
| 2Bh | 0Ah | | |
| 2Ch | 00h | | ELEMENT ID (ID=6) |
| 2Dh | 06h | | |
| 2Eh | 80h | ICON LINK 1 | ELEMENT TYPE (ICON) |
| 2Fh | 0Ch | | |
| 30h | 00h | | ELEMENT ID (ID=7) |
| 31h | 07h | | |
| ... | ... | ... | ... |
| 3Ah | 80h | ICON LINK 4 | ELEMENT TYPE (ICON) |
| 3Bh | 0Ch | | |
| 3Ch | 00h | | ELEMENT ID (ID=10) |
| 3Dh | 0Ah | | |

FIG. 7A

UNIT SPEC

| CTS | CTYPE | SUBUNIT_TYPE | SUBUNIT ID | OPCODE | OPERAND (0) |
|---|---|---|---|---|---|
| OPERAND (1) | OPERAND (2) | | OPERAND (3) | | OPERAND (4) |
| ---------- | | | | | |
| OPERAND (n) | "0" PADDING (IF NECESSARY) | | | | |

FIG. 7B

| CTS | RESPONSE | SUBUNIT_TYPE | SUBUNIT ID | OPCODE | OPERAND (0) |
|---|---|---|---|---|---|
| OPERAND (1) | OPERAND (2) | | OPERAND (3) | | OPERAND (4) |
| ---------- | | | | | |
| OPERAND (n) | "0" PADDING (IF NECESSARY) | | | | |

FIG. 8A

| OPCODE | GUI UPDATE |
|---|---|
| OPERAND [0] | SOURCE_PLUG |
| OPERAND [1] | : |
| OPERAND [2] | : |
| OPERAND [3] | SUB FUNCTION |
| OPERAND [4] | : |

FIG. 8B

| SUB FUNCTION VALUE | SUB FUNCTION |
|---|---|
| 00h | OPEN |
| 01h | CLOSE |
| 02h | RESTORE |
| 03h | START |
| 04h | STOP |
| 06h | CHANGE |
| OTHERS | (RESERVED) |

FIG. 9A

| OPCODE | PUSH GUI DATA |
|---|---|
| OPERAND [0] | SOURCE_PLUG |
| OPERAND [1] | -- |
| OPERAND [2] | -- |
| OPERAND [3] | -- |
| OPERAND [4] | -- |
| OPERAND [5] | INDICATOR |
| OPERAND [6] | ELEMENT_ID |
| OPERAND [7] | |
| OPERAND [8] | |
| OPERAND [9] | |

FIG. 9B

| | msd | | | | lsb |
|---|---|---|---|---|---|
| OPERAND [5] | (RESERVED) | | LEVEL | | WITH DATA |

FIG. 9C

| LEVEL | RANGE |
|---|---|
| 00 | ITSELF |
| 01 | ITSELF AND NEXT LEVEL |
| 10 | ALL LEVEL |
| 11 | (RESERVED) |

FIG. 10

| OPCODE | USER ACTION |
|---|---|
| OPERAND [0] | SOURCE_PLUG |
| OPERAND [1] | : |
| OPERAND [2] | : |
| OPERAND [3] | ELEMENT_ID |
| OPERAND [4] | |
| OPERAND [5] | |
| OPERAND [6] | |
| OPERAND [7] | ACTION_TYPE |
| OPERAND [8] | DATA |
| : | : |
| : | : |

FIG. 11

| OPCODE | DIRECT_ACTION |
|---|---|
| OPERAND [0] | ACTION_CODE |
| OPERAND [1] | ACTION_TYPE |
| OPERAND [2] | ACTION_DATA_LENGTH |
| OPERAND [3] | ACTION_SPECIFIED_DATA |
| OPERAND [4] | : |
| OPERAND [5] | : |
| : | : |

FIG. 12

| ACTION CODE | USER OPERATION |
|---|---|
| 00h | ENTER |
| 01h | UP |
| 02h | DOWN |
| 03h | LEFT |
| 04h | RIGHT |
| 05h | MENU |
| 06h | EPG |
| 07h | CANCEL |
| ⋮ | ⋮ |
| 20h | POWER |
| 21h | VOLUME UP |
| 22h | VOLUME DOWN |
| 23h | MUTE |
| 24h | PLAY |
| 25h | STOP |
| 26h | PAUSE |
| 27h | RECORD |
| 28h | REWIND |
| 29h | FAST FORWARD |
| 2Ah | EJECT |
| 2Bh | FORWARD |
| 2Ch | BACKWARD |
| ⋮ | ⋮ |
| ⋮ | ⋮ |
| FEh | VENDER UNIQUE |
| FFh | (RESERVED) |

COMMUNICATION SYSTEM, COMMUNICATION APPARATUS, AND COMMUNICATION METHOD

BACKGROUND OF THE INVENTION

1. Field of the Invention

The present invention relates to a system, an apparatus, and a method for remotely operating a desired electronic device by means of a graphical user interface.

2. Related Background Art

In recent years there have been developed high-speed and advanced digital interfaces for transmitting data expected to have real time properties such as a dynamic image (moving image) or a sound or voice and data on which it is expected that a user can rely, for communications such as a static image and a control command. A digital interface conforming to the IEEE1394-1995 standards is one of these digital interfaces.

Furthermore, there recently has been suggested that electronic devices in a house having this type of digital interfaces (for example, AV (audio-visual) equipment, household electric appliances, and a personal computer, etc.) might be connected with each other so as to construct a home network.

In such a home network, a device functioning as a center of the home network may, for example, be a television set. If so, the television set provides a user with graphical user interfaces for remotely operating other devices, and the user operates a graphical user interfaces displayed on the television set to operate a device corresponding to the graphical user interface.

There are, however, a plurality of types of devices connectable to the home network, and they have operating environments different from each other. Furthermore, even if the devices have the same function, their operating environments depend upon their manufacturers or model types.

Therefore, there is a problem in that the television set is required to cope with graphical user interfaces depending upon manufacturers or model types flexibly.

In addition, there is also a problem in that the different operation methods for each graphical user interface will cause operation to be complicated. To solve this problem, there can be a method of operating each graphical user interface by using direction keys and selection keys.

This method, however, has the problem of requiring the direction keys to be operated by a user a plurality of number of times until a desired function is selected, as a result of which it takes much time to execute the desired function. Particularly if a plurality of operations are required to be executed continuously, the operations are complicated, and so quick operations cannot be performed, which is disadvantageous.

SUMMARY OF THE INVENTION

An object of the present invention is to solve the above-described problems.

According to one aspect, the present invention which achieves this object can be a communication system, having a control apparatus adapted to receive an operation panel for operating a controlled apparatus from the controlled apparatus, and to display the operation panel on a display unit; and an operation apparatus having a first operation unit for operating the operation panel and a second operation unit for operating a specific function of the controlled apparatus, and the control apparatus is adapted to receive a control signal from the operation apparatus, and determine, according to the control signal, whether or not to transmit a command for operating the specific function from the control apparatus to the controlled apparatus.

According to another aspect, the present invention which achieves this object may be a control apparatus that receives an operation panel for operating a controlled apparatus from the controlled apparatus, and displays the operation panel on a display unit, the control apparatus comprising: a receiving unit adapted to receive a control signal from an operation apparatus having a first operation unit for operating the operation panel and a second operation unit for operating a specific function of the controlled apparatus, and a control unit adapted to determine, according to the control signal, whether or not to transmit a command for operating the specific function from the control apparatus to the controlled apparatus.

According to still another aspect, the present invention which achieves this object may be a method performed in a control apparatus that receives an operation panel for operating a controlled apparatus from the controlled apparatus, and displays the operation panel on a display unit, the method comprising the steps of receiving a control signal from an operation apparatus having a first operation unit for operating the operation panel, and a second operation unit for operating a specific function of the controlled apparatus, and determining, according to the control signal, whether or not to transmit a command for operating the specific function from the control apparatus to the controlled apparatus.

Other aspects of the present invention are set forth in this application, and are not disclaimed, whether or not they may be claimed in the present application.

Still other objects of the present invention, and the advantages thereof, will become fully apparent from the following detailed description of the embodiments.

BRIEF DESCRIPTION OF THE DRAWINGS

FIG. 5 is a diagram of assistance in explaining an example of a data structure of a panel element according to a preferred embodiment of the present invention;

FIGS. 7A and 7B are diagrams of assistance in explaining an example of a frame structure of a control command and a response;

FIGS. 8A and 8B are diagrams of assistance in explaining a command frame of a GUI_UPDATE command according to a preferred embodiment of the present invention;

FIGS. 9A, 9B and 9C are diagrams of assistance in explaining a command frame of a PUSH_GUI_DATA command according to a preferred embodiment of the present invention;

FIG. 10 is a diagram of assistance in explaining a command frame of a USER_ACTION command according to a preferred embodiment of the present invention;

FIG. 11 is a diagram of assistance in explaining a command frame of a DIRECT_ACTION command according to a preferred embodiment of the present invention;

FIG. 12 is a diagram showing an example of action_code;

DETAILED DESCRIPTION OF THE PREFERRED EMBODIMENTS

The preferred embodiments of the present invention will now be described in detail hereinafter with reference to the accompanying drawings.

Figure 1:
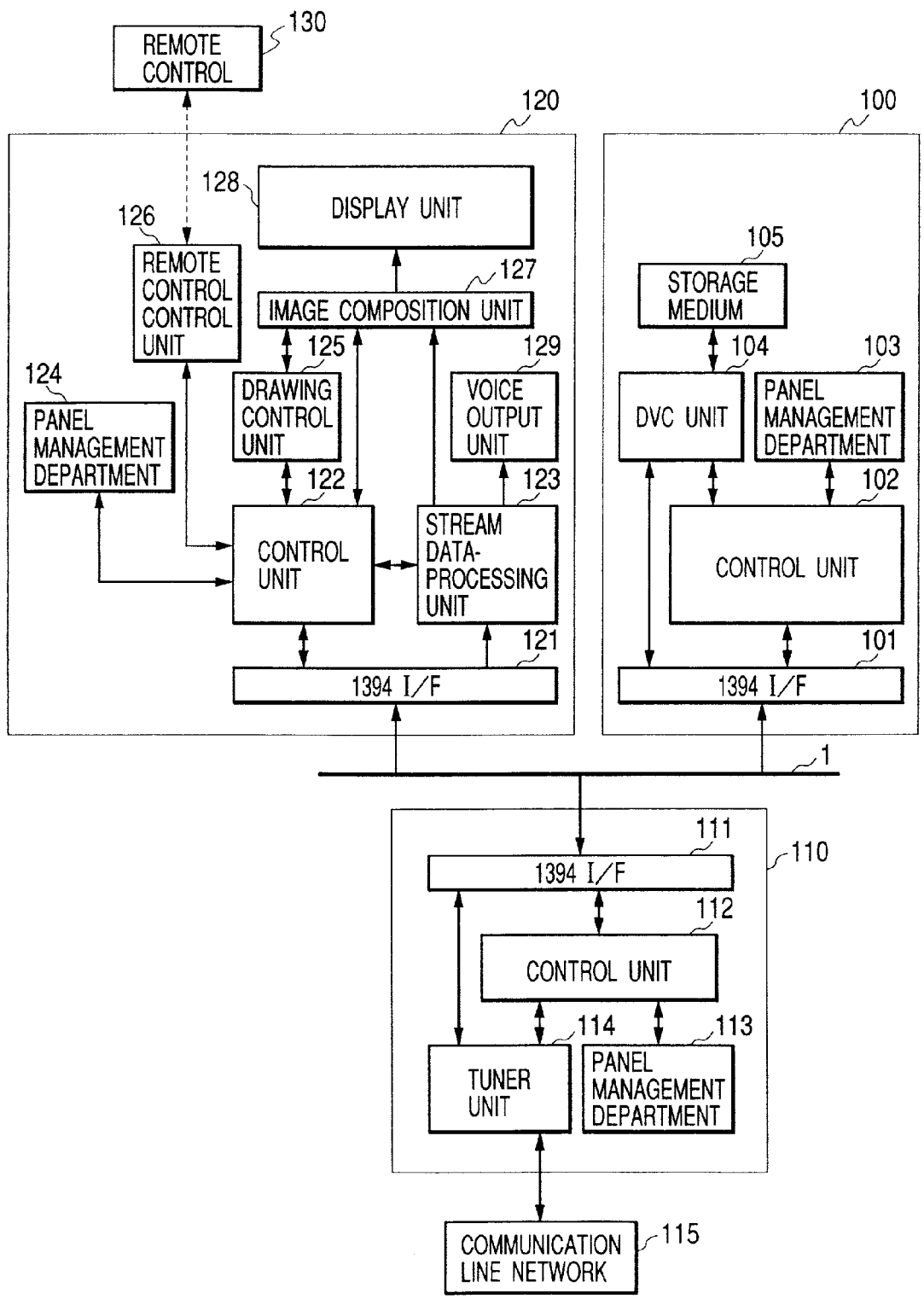
FIG. 1 is a block diagram of assistance in explaining an example of a remote control system according to a preferred embodiment of the present invention.

Referring to FIG. 1, there is shown a block diagram of assistance in explaining an example of a remote control system according to this embodiment.

In this system, reference numeral 1 designates a digital communication network. This network 1 is realized by a high-speed serial bus conforming to the IEEE1394-1995 standards and its extended standards (hereinafter, referred to as IEEE1394 standards).

Reference numeral 100 designates a camera-integrated digital video recorder (hereinafter, a DVC) which is an example of a controlled device in this system. The DVC 100 has an operation panel for providing an operating environment characteristic of the DVC 100.

Reference numeral 110 designates a tuner that is an example of a controlled device in this system. The tuner 110 has an operation panel for providing an operating environment characteristic of the tuner 110 in the same manner as the DVC 100.

The operation panel (also referred to as an operation screen) comprises an image or a text and it is a graphical user interface providing a user with a graphical operating environment easy to understand visually.

Reference numeral 120 designates a digital television set (hereinafter, a digital television) which is an example of a controller in this system. The digital television 120 displays an operation panel of each controlled device to provide a graphical operating environment.

Reference numeral 130 designates a remote controller (hereinafter, a remote control) for operating the operation panel displayed on the digital television 120. The remote control 130 converts an operation input of a user to a predetermined control signal and wirelessly transmits the control signal to the digital television 120. The user can operate the operation panel displayed on the digital television 120 by using the remote control 130 to remotely operate a controlled device corresponding to the operation panel.

First, a configuration of the DVC 100 will be described below. There are shown a digital interface (hereinafter, a 1394 interface) conforming to the IEEE1394 standards, a control unit 102, a Panel Management Department 103, and a DVC unit 104.

The Panel Management Department 103 stores GUI (graphical user interface) data forming an operation panel of the DVC 100 in accordance with a data structure described later. If an operation intended for the operation panel is detected, the Panel Management Department 103 reads out (or generates) GUI data corresponding to the operation and supplies it to the 1394 interface 101.

The DVC unit 104 records stream data (including digital video data, digital audio data, and text data) conforming to a predetermined data format on a storage medium 105 or reproduces desired stream data required by a user from the storage medium 105. The storage medium 105 comprises a magnetic tape, a magnetic disk, an optical disk, a semiconductor memory, and a hard disk or their combinations and is removable. As a predetermined data format, the DV mode, the MPEG2 mode, or other modes are used. The stream data recorded on the storage medium 105 by the DVC unit 104 is generated on the basis of an isochronous packet received by the 1394 interface 101 and the stream data reproduced from the storage medium 105 by the DVC unit 104 is supplied to the 1394 interface 101.

The 1394 interface 101 is connected to a 1394 interface of another device via the network 1. The 1394 interface 101 generates the isochronous packet on the basis of the stream data supplied by the DVC unit 104 and isochronously transfers this isochronous packet. In addition the 1394 interface 101 receives an asynchronous packet including a control command for controlling operations of the Panel Management Department 103, the DVC unit 104 and the like and supplies the control command to the control unit 102. Furthermore, the 1394 interface 101 generates an asynchronous packet on the basis of the GUI data supplied by the Panel Management Department 103 and asynchronously transfers this asynchronous packet.

The control unit 102 has communications via the network 1 to control the operations of the DVC unit 104 and the Panel Management Department 103. The control unit 102 reads out a program for realizing a processing procedure of this embodiment from the internal storage medium and integrally controls respective units of the DVC 100 on the basis of the program.

Next, a configuration of the tuner 110 will be described below. There are shown a 1394 interface 111, a control unit 112, a Panel Management Department 113, and a tuner unit 114.

The Panel Management Department 113 stores GUI data forming an operation panel of the tuner 110 and stores it in accordance with a data structure described later. If an operation intended for the operation panel is detected, the Panel Management Department 113 reads out (or generates) GUI data corresponding to the operation and supplies it to the 1394 interface 111.

The tuner unit 114 selectively receives a desired digital broadcasting wave from a communication line network 115, selects desired stream data (including digital video data, digital audio data, and text data) from the received digital broadcasting wave, and supplies the selected stream data to the 1394 interface 111. The communication line network 115 comprises a ground-based broadcasting network, a satellite broadcasting network, a cable television broadcasting network, a public line network, and a mobile communication network or their combinations.

The 1394 interface 111 is connected to a 1394 interface of another device via the network 1. The 1394 interface 111 generates an isochronous packet on the basis of the stream data supplied by the tuner unit 114 and isochronously transfers the isochronous packet. In addition the 1394 interface 111 receives an asynchronous packet including a control command for controlling operations of the Panel Management Department 113, the tuner unit 114, and the like and supplies this control command to the control unit 112. Furthermore, the 1394 interface 111 generates an asynchronous packet on the basis of the GUI data supplied by the Panel Management Department 113 and asynchronously transfers this asynchronous packet.

The control unit 112 has communications via the network 1 to control the operations of the tuner unit 114 and the Panel Management Department 113. The control unit 112 reads out a program for realizing a processing procedure of this embodiment from the internal storage medium and integrally controls respective units of the tuner unit 114 on the basis of the program.

Next, a configuration of the digital television 120 will be described below. There are shown a 1394 interface 121, a control unit 122, a stream data-processing unit 123, a Panel Management Department 124, a drawing control unit 125, a remote control control unit 126, an image composition unit 127, a display unit 128, a voice output unit comprising a speaker 129.

The stream data-processing unit 123 generates stream data from the isochronous packet received by the 1394 interface 121 and then separates this stream data into video stream data and audio stream data. The stream data-processing unit 123 further decodes each stream data to supply the video data to the image composition unit 127 and to supply the audio data to the voice output unit 129.

The voice output unit 129 digital-analog-converts the audio data supplied by the stream data-processing unit 123 and amplifies it to be output.

The Panel Management Department 124 stores the operation panels which have been transferred from respective controlled devices and manages them for each controlled device.

The drawing control unit 125 controls drawings of the respective operation panels. Specifically it controls a display position, a display size, a display time, rewriting of displayed contents, a focus navigation and the like of each operation panel.

The image composition unit 127 synthesizes the video data supplied by the stream data-processing unit 123 with the operation panel supplied by the drawing control unit 125 and digital-analog-converts the composed video data so as to be supplied to the display unit 128.

The display unit 128 comprises a predetermined display and displays a video signal supplied by the image composition unit 127 on this display. The predetermined display is a CRT (cathode-ray tube), a liquid crystal panel, a plasma display panel, a projection-type display panel, or the like.

The remote control unit 126 communicates with the remote control 130 via a transmission medium such as an infrared ray or a radio wave. The remote control control unit 126 receives a control signal from the remote control 130 and supplies this control signal to the control unit 122.

The 1394 interface 121 is connected to a 1394 interface of another device via the network 1. The 1394 interface 121 receives an asynchronous packet including GUI data and supplies this GUI data to the Panel Management Department 124 and the drawing control unit 125. The 1394 interface 121 asynchronously transfers a control command obtained by operating the remote control 130 to a controlled device. Furthermore, the 1394 interface 121 receives an asynchronous packet including a control command for controlling operations of the stream data-processing unit 123, the Panel Management Department 124, the drawing control unit 125 and the like and supplies this control command to the control unit 122.

The control unit 122 reads out a program for realizing a processing procedure of this embodiment from the internal storage medium and integrally controls respective units of the digital television 120 on the basis of the program.

Basic functions of the 1394 interfaces 101, 102, and 103 will be described below.

These 1394 interfaces are capable of coping with a daisy-chain connection, a node branch connection, and their combinations, thus enabling connections having a high degree of freedom. Respective transfer rates are 100 Mbps, 200 Mbps, and 400 Mbps and data is transferred in a serial transfer mode. An interface having a high-order transfer rate is free to be connected to interfaces having their maximum transfer rates different from each other so as to support low-order data transfer rates.

In addition, the 1394 interfaces support two transfer modes; an asynchronous transfer mode and an isochronous transfer mode. The asynchronous transfer mode is appropriate for transferring a control command, file data or other data. The isochronous transfer mode is used for ensuring a certain amount of a data transfer per predetermined transfer cycle (a single transfer cycle is approx. 125 μs). The isochronous transfer mode is appropriate for transferring data expected to have a temporal continuity (what is called stream data) such as video data and audio data. In a single transfer cycle period, the isochronous transfer mode has a higher priority than the asynchronous transfer mode.

(Description of Operation Panel)

Figure 2:
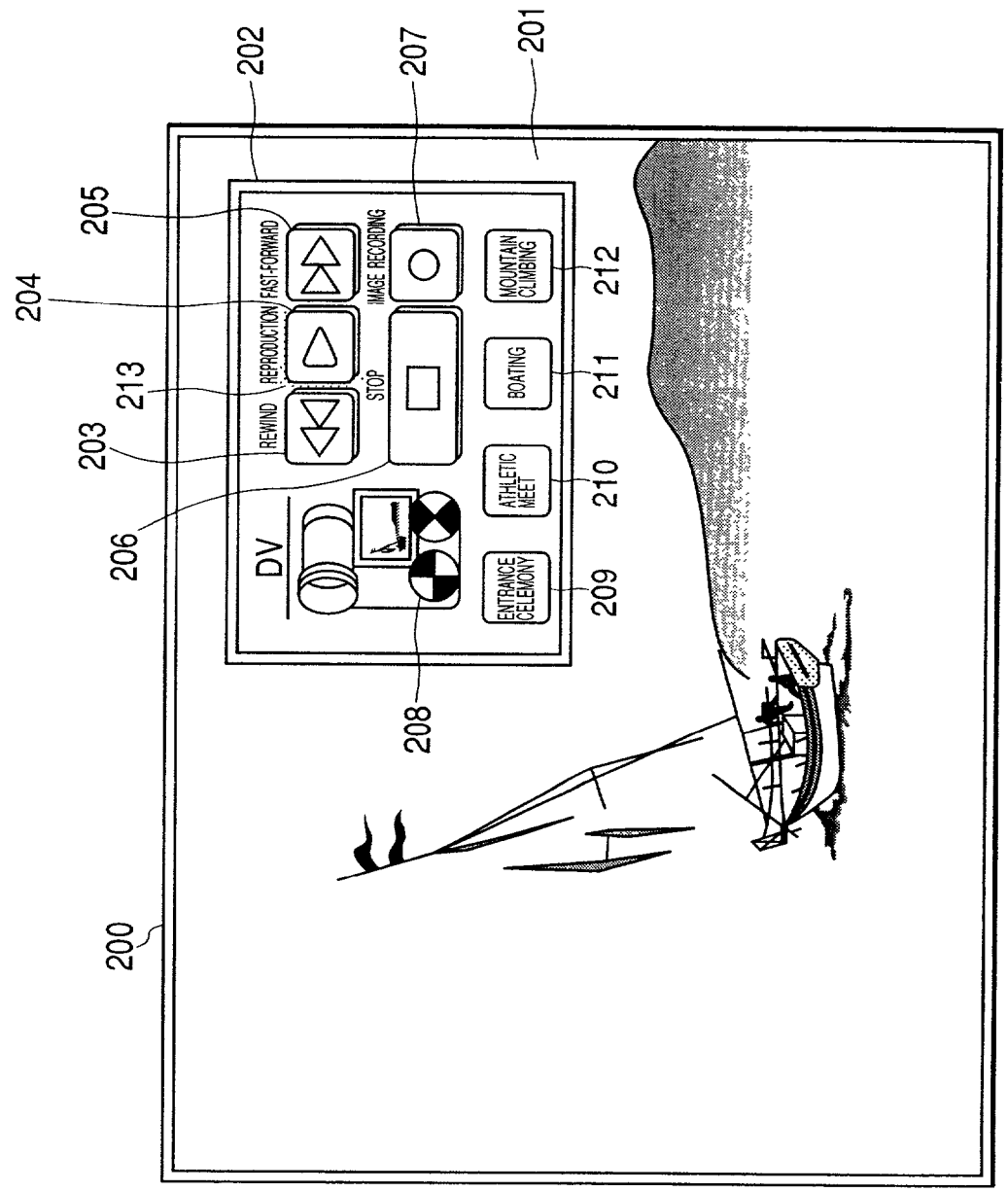
FIG. 2 is a diagram showing an example of an operation panel according to a preferred embodiment of the present invention.

Referring to FIG. 2, there is shown a diagram of a sample operation panel according to this embodiment. In FIG. 2, an example is given for a description of displaying an operation panel of the DVC 100 which is one of the controlled devices on the display unit 128 of the digital television 120, for example.

In FIG. 2, there are shown a display screen 200 for the display unit 128, stream data 201 isochronously transferred by the DVC 100, and an operation panel as a panel element 202 for the DVC 100.

Reference numerals 203 to 207 designate button elements. The button element 203, the button element 204, the button element 205, the button element 206, and the button element 207 correspond to a rewind function, a reproduction function, a fast-forward function, a stop function, and an image recording function, respectively. Reference numeral 208 designates an animation element.

Reference numerals 209 to 212 designate icon elements. The icon elements 209 to 212 correspond to respective contents recorded on a storage medium to be reproduced by the DVC 100. If the remote control 130 selects one of these icon elements 209 to 212, the DVC 100 starts a reproduction of a content corresponding to the icon element at 209 to 212 and the reproduced content is isochronously transferred to the DVC 100.

Reference numeral 213 designates a focus. The focus 213 gives visual expressions to the elements 203 to 212 by means of a highlighting display or a color change. A position of the focus 213 moves in response to an operation of the remote control 130. Processing of operating the focus in response to an operation of the remote control 130 is referred to as focus navigation.

While the embodiment has been described by giving an example of displaying the operation panel of the DVC 100 on the display unit 128 of the digital television 120 in FIG. 2, it is also possible to display an operation panel of the tuner 110.

(Data Structure of Operation Panel)

Figure 4:
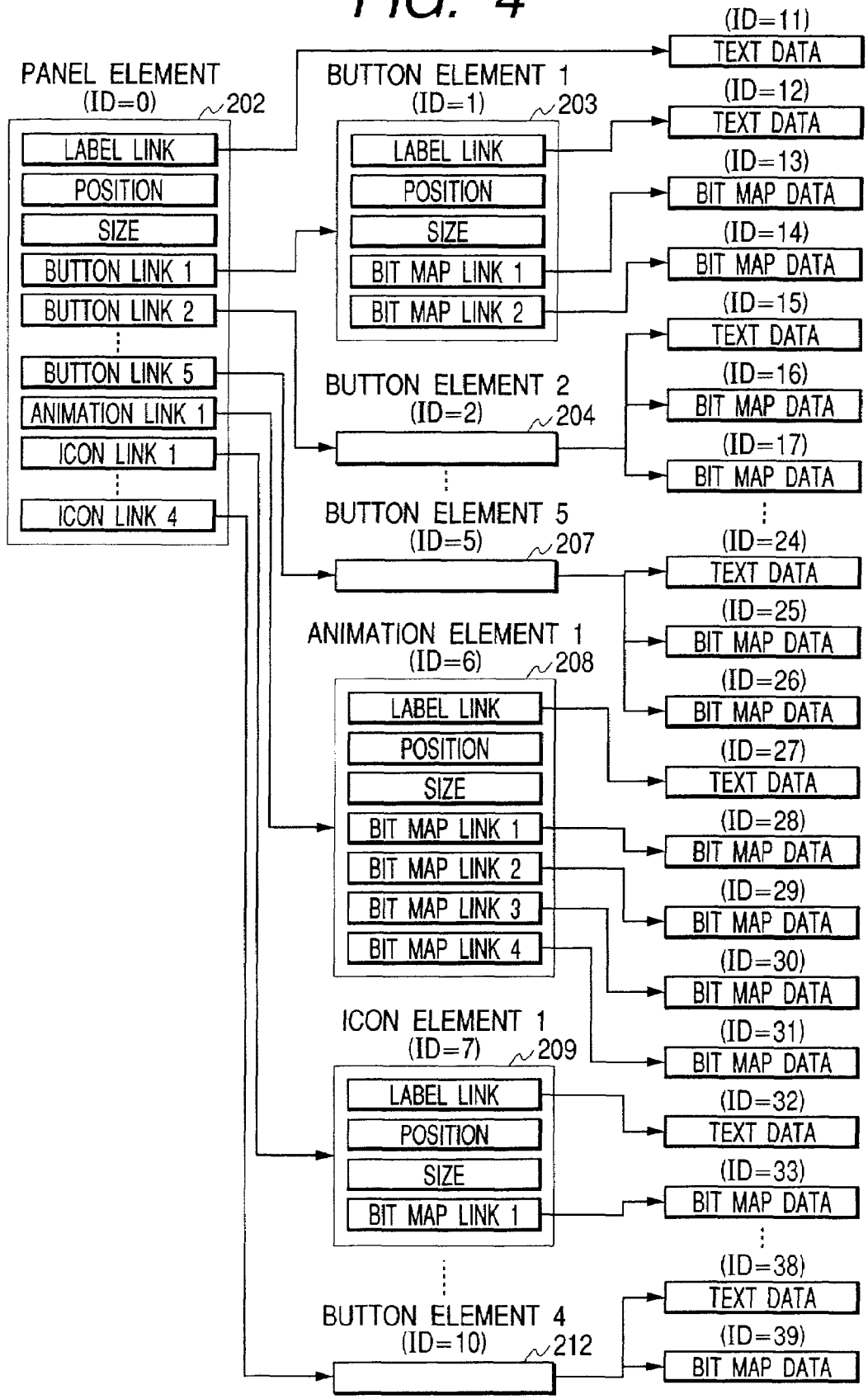
FIG. 4 is a diagram of assistance in explaining an example of a data structure of the operation panel according to a preferred embodiment of the present invention.

Referring to FIG. 4 and FIG. 5, there are shown examples of data structures of operation panels according to this embodiment. FIG. 4 shows a diagram of a data structure of the operation panel 202. As shown in FIG. 4, GUI elements 202 to 212 forming the operation panel 202 have a tree structure routed from the panel element 202. FIG. 5 shows a diagram of a data structure of the panel element 202.

In FIG. 4, the panel element 202 retains a link with text data showing a title and a functional description, a display position, a display size, and links with the elements 203 to 212. Each of the button elements 203 to 207 retains a link with text data showing a title and a functional description, a display position, a display size, and links with bit map image data corresponding to "depression" and "release" user actions.

In addition, in FIG. 4, the animation element 208 retains a link with text data showing a title and a functional description, a display position, a display size, and four links with bit map image data. Each of the icon elements 209 to 212 retains a link with text data showing a title and a functional description, a display position, a display size, and bit map image data corresponding to a "selection" user action.

As shown in FIG. 4 and FIG. 5, an element ID is given to each GUI element and actual data linked therewith.

While the data structures of the operation panels of the DVC 100 have been described in FIG. 4 and FIG. 5, operation panels of the tuner 110 have the same data structures as shown in FIG. 4 and FIG. 5.

(Description of Remote Control)

Figure 3:
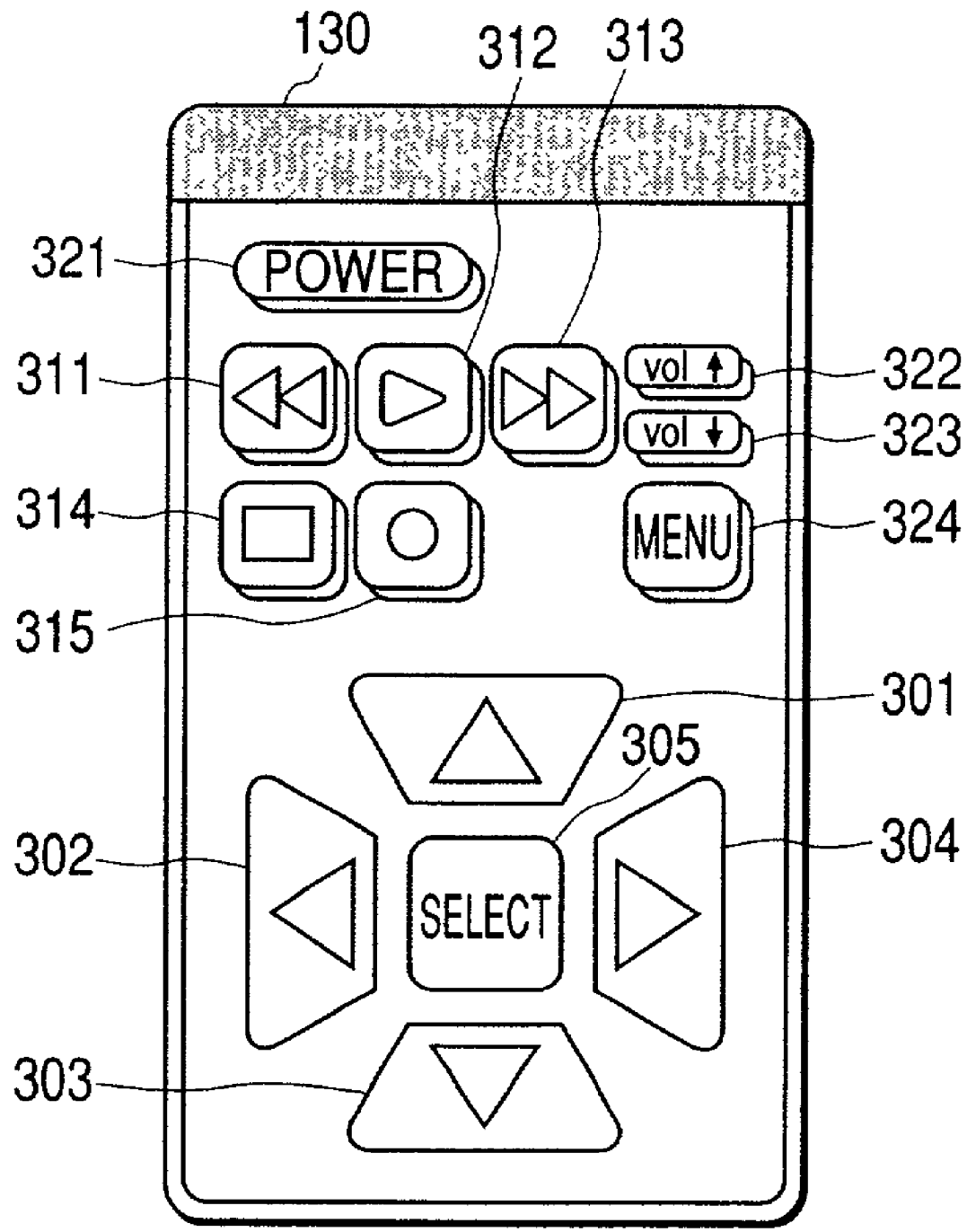
FIG. 3 is a diagram showing an example of a remote control according to a preferred embodiment of the present invention.

Referring to FIG. 3, there is shown a diagram of an example of a remote control 130 according to this embodiment.

In FIG. 3, there are shown operation keys 301 to 305 for specifying movements of the focus 213. The reference numeral 301 designates a direction key for specifying a movement in an upper direction. The focus 213 displayed on the operation panel moves upward according to an operation of the key 301. The reference numeral 302 designates a direction key for specifying a movement to the left. The focus 213 displayed on the operation panel moves to the left according to an operation of the key 302. The reference numeral 303 designates a direction key for specifying a movement in a lower direction. The focus 213 displayed on the operation panel moves downward according to an operation of the key 303. The reference numeral 304 designates a direction key for specifying a movement to the right. The focus 213 displayed on the operation panel moves to the right according to an operation of the key 304. The reference numeral 305 designates a determination key for specifying a selection or a decision.

Control signals corresponding to these keys 301 to 305 are supplied to the control unit 122 via the remote control control unit 126 of the digital television 120. The control unit 122 controls movements of the focus 213 on the basis of the control signals corresponding to the keys 301 to 304.

The control unit 122 detects one of the "depression", "release", and "selection" user actions on the basis of a control signal corresponding to the key 305. For example, if the focus 213 is adjusted to one of the button elements, the "depression" or "release" user action is detected. If the focus 213 is adjusted to one of the icon elements or the animation element, the "selection" user action is detected. The detected user action is converted to a USER_ACTION command described later and then asynchronously transferred to a controlled device.

In the above, the "depression" means that the button element to which the focus 213 is adjusted has been put in a selected condition, the "release" means that the button element to which the focus 213 is adjusted to has been put in a non-selected condition, and "selection" means that the icon element or the animation element to which the focus 213 is adjusted has been put in a selected condition.

A method of operating the operation panel by using the keys 301 to 305 for remotely operating the controlled device as set forth in the above is referred to as a focus navigation mode in this embodiment.

Furthermore, in FIG. 3, there are shown operation keys 311 to 315 associated with operations corresponding to specific functions, where operations corresponding to the specific functions covered by the keys 311 to 315 depend upon an operation panel currently under the operation.

The reference numeral 311 designates an operation key for specifying a movement in a past, lower, or backward direction or a start or the like of rewinding. The reference numeral 312 designates an operation key for specifying a start or the like of reproduction. The reference numeral 313 designates an operation key for specifying a movement in a future, upper, or forward direction or a start or the like of a fast-forward operation. The reference numeral 314 designates an operation key for specifying a stop or the like of reproduction, rewinding, fast-forward or other operations. The reference numeral 315 designates an operation key for specifying a start or the like of recording.

Control signals corresponding to these keys 311 to 315 are supplied to the control unit 122 via the remote control control unit 126 of the DTV 110. The control unit 122 determines a currently selected operation panel and detects which key among the keys 311 to 315 has been depressed on the basis of the control signal before generating a DIRECT_ACTION command described later. This DIRECT_ACTION command is asynchronously transferred to the controlled device.

A method of remotely operating a specific function of the controlled device with a single-action button operation by using the keys 301 to 305 without any operation of the operation panel is referred to as a direct action mode in this embodiment. The direct action mode requires less operation procedures in comparison with the focus navigation mode and enables the controlled device to be remotely operated even if the operation panel is not displayed. As set forth hereinabove, there are provided two operation methods, the focus navigation mode and the direct action mode in this embodiment.

Furthermore, in FIG. 3, there are shown operations keys 321 to 324 for specifying operations on the DTV 110. The reference numeral 321 designates an operation key for specifying the power supply of the DTV 110 to be turned on or off. The reference numeral 322 designates an operation key for specifying an increase of the volume of a sound or voice outputted by the DTV 110. The reference numeral 323 designates an operation key for specifying a decrease of the volume of a sound or voice outputted by the DTV 110. The reference numeral 324 designates an operation key for calling a menu screen for adjusting various functions of the DTV 110. On the menu screen, there are items for selecting a display or a non-display of an operation panel and items for selecting a desired operation panel. A user can change the display to the non-display or vice versa of the operation panel or can select an operation panel to be operated by operating these items.

Control signals corresponding to these keys 321 to 324 are supplied to the control unit 122 via the remote control control unit 126 of the DTV 110. The control unit 122 controls the power supply to be turned on or off, a volume adjustment, a menu screen call, or the like on the basis of the control signals.

As set forth hereinabove, the remote control 130 are provided with the first operation keys 301 to 305 for operating the operation panel of the controlled device and the second operation keys 311 to 315 directly associated with the specific functions of the controlled device, thereby enabling two types of operation methods to be provided.

(Description of Protocol)

Figure 6:
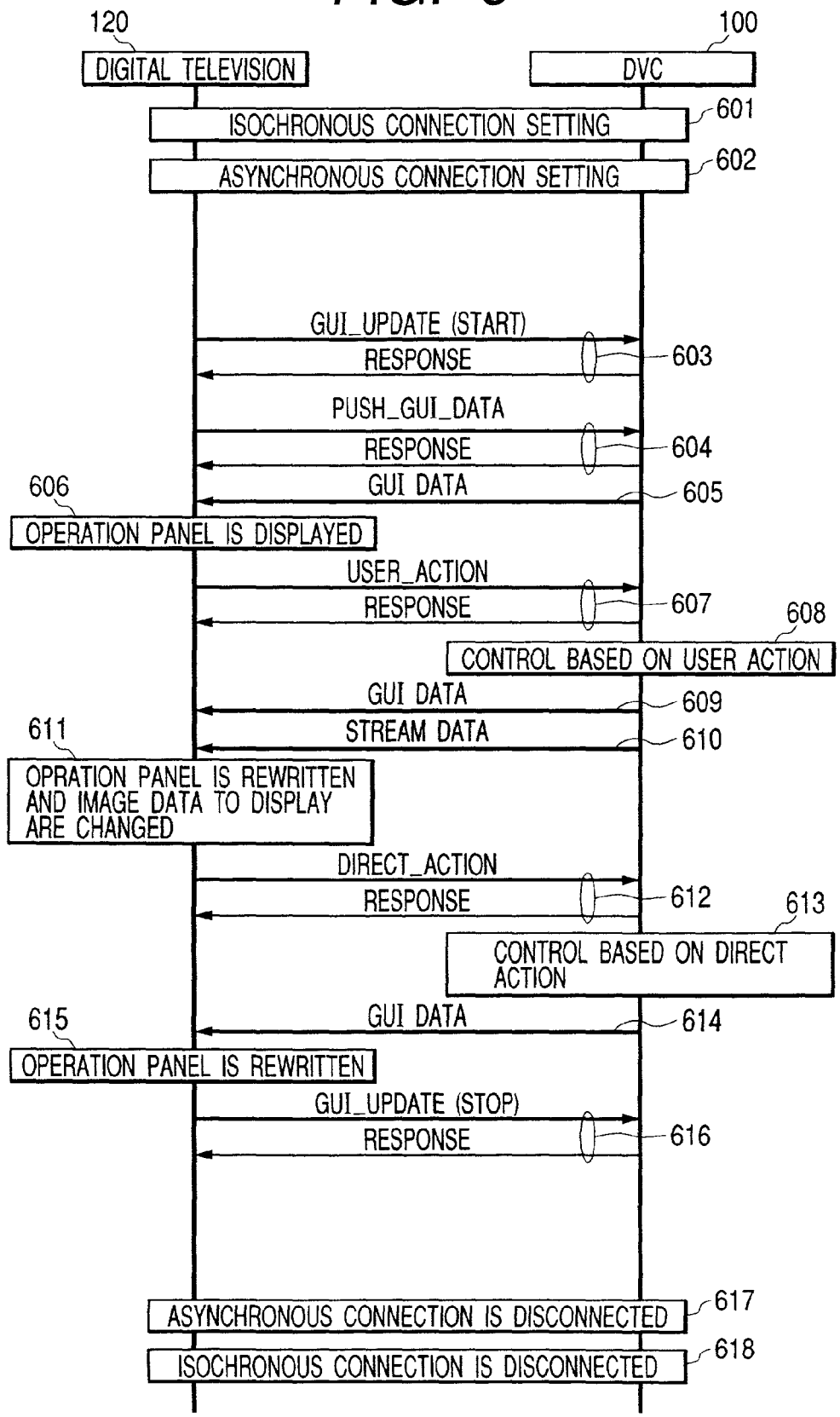
FIG. 6 is a diagram of assistance in explaining an example of a protocol for a remote control system according to a preferred embodiment of the present invention.

Referring to FIG. 6, there is shown a diagram of an example of a protocol of a remote control system according to this embodiment. By referring to FIG. 6, there is provided a description of a protocol between the digital television 120 which is a controller and the DVC 100 which is one of the controlled devices.

The 1394 interface 121 of the digital television 120 initially establishes an isochronous connection between the digital television 120 and the DVC 100 in accordance with a predetermined connection establishment procedure (601 in FIG. 6). The DVC 100 isochronously transfers the stream data to the digital television 120 via this isochronous connection.

Specifically, after accessing an IRM (isochronous resource manager; the digital television 120 realizes this function here, for example) of a 1394 network and securing a channel and a band for the isochronous transfer, a peer-to-peer connection (a one-for-one logical connection) is established between an isochronous plug (which functions as a virtual output plug) of the 1394 interface 101 of the DVC 100 and an isochronous plug (which functions as a virtual input plug) of the 1394 interface 121 of the digital television 120.

Next, the 1394 interface 121 of the digital television 120 establishes an asynchronous connection between the digital television 120 and the DVC 100 in accordance with a predetermined connection establishment procedure (602 in FIG. 6). The DVC 100 asynchronously transfers GUI data of an operation panel to the digital television 120 via this asynchronous connection.

The 1394 interface 121 of the digital television 120 issues a GUI_UPDATE (start) command (603 in FIG. 6). This GUI_UPDATE (start) command is used for specifying a start of transferring the operation panel of the DVC 100.

The 1394 interface 121 of the digital television 120 issues a PUSH_GUI_DATA command (604 in FIG. 6). This PUSH_GUI_DATA command is used for requesting the operation panel of the DVC 100.

After receiving the PUSH_GUI_DATA command, the DVC 100 reads out the GUI data of its own operation panel from the Panel Management Department 103 and supplies it to the 1394 interface 101. The 1394 interface 101 sequentially transfers asynchronously this GUI data to the digital television 120 via the asynchronous connection (605 in FIG. 6).

After receiving the GUI data of the DVC 100, the digital television 120 displays the operation panel of the DVC 100 on the basis of the GUI data and provides a user with a graphical operating environment (606 in FIG. 6).

Specifically, the digital television 120 stores the GUI data of the DVC 100 in the Panel Management Department 124. The control unit 122 reads out this GUI data for each GUI element and supplies it to the drawing control unit 125. The drawing control unit 125 analyzes a data structure of each GUI element, checks a position, a size, and contents for a display, and then controls the image composition unit 127 on the basis of the analysis result. The image composition unit 127 synthesizes the GUI element supplied by the drawing control unit 125 with video data supplied by the stream data-processing unit 123 and digital-analog-converts the composed video data to a predetermined video signal. The display unit 128 provides a user with a graphical operating environment as shown in FIG. 2, for example, by displaying this video signal.

After displaying the operation panel of the DVC 100, the digital television 120 enables the above two operation methods (namely, the focal navigation mode and the direct action mode) to be executed.

In the focus navigation mode, a focus navigation is performed in accordance with a user operation and a user action ("depression", "selection", etc.) permitted for each GUI element is accepted. On the other hand, in the direct action mode, a direct action is accepted in accordance with any of the keys 311 to 315 of the remote control 130 independently of whether there is a display of the operation panel.

If the user action is detected, the 1394 interface 121 issues a USER_ACTION command (607 in FIG. 6). This USER_ACTION command is used for indicating what user action has occurred for a certain GUI element. There will be described hereinafter a case of issuing the USER_ACTION command indicating that a "depression" user action has occurred to the icon element 209, for example.

After receiving the USER_ACTION command, the DVC 100 controls the DVC unit 104 on the basis of a GUI element and a user action specified by the USER_ACTION command (608 in FIG. 6). For example, the DVC unit 104 retrieves and reproduces contents corresponding to the icon element 209 from the storage medium 105 and supplies these contents as stream data to the 1394 interface 101.

If the GUI of the operation panel changes in accordance with the USER_ACTION command, the DVC 100 reads out the GUI data corresponding to the change portion from the Panel Management Department 103 and transfers the GUI data to the digital television 120 via the asynchronous connection (609 in FIG. 6).

The DVC 100 transfers the contents corresponding to the icon element 209 via the isochronous connection (610 in FIG. 6).

After receiving the GUI data and the contents corresponding to the icon element 209, the digital television 120 updates the operation panel of the DVC 100 on the basis of the received GUI data and synthesizes the updated operation panel with the received contents before displaying (611 in FIG. 6).

On the other hand, if the direct action is detected, the 1394 interface 121 issues a DIRECT_ACTION command (612 in FIG. 6).

Receiving the DIRECT_ACTION command, the DVC 100 controls specific functions specified by the DIRECT_ACTION command (613 in FIG. 6).

In the above, if the specific function specified by the DIRECT_ACTION command is invalid for the DVC 100 which is a controlled device, in other words, if it is not included in services provided by the DVC 100 or cannot be temporarily executed due to an internal condition, an error response indicating a non-executable condition is returned.

If the GUI of the operation panel changes in accordance with the DIRECT_ACTION command, the DVC 100 reads out the GUI data corresponding to the change portion from the Panel Management Department 103 and transfers the GUI data to the digital television 120 via the asynchronous connection (614 in FIG. 6).

The digital television 120 updates the operation panel of the DVC 100 on the basis of the received GUI data (615 in FIG. 6). In the above, if the operation panel is in a non-display condition, the digital television 120 displays the updated operation panel on the display screen until the user specifies a non-display condition or until a predetermined period of time elapses. This configuration enables the result of the operation to be graphically expressed on the operation panel even if an operation is executed in the direct action mode. In addition, a user can visually confirm which function of the DVC 100 has been actually operated, by which the current operating condition can always be grasped.

The digital television 120 and the DVC 100 repeatedly execute the procedure in 604 to 615 to accept the operations in the focus navigation mode and the direct action mode. This enables the user to use two operation methods together, by which a plurality of operations can be continuously performed in a short time. Therefore, for example, it is effective to repeat the reproduction, fast-forward, reproduction, and fast-forward operations in a short time. In addition, for example, it is also effective to continuously operate GUI elements located apart from each other on the operation panel in a short time.

If the operation in the focus navigation mode and the direct action mode is terminated, the 1394 interface 121 of the digital television 120 issues a GUI_UPDATE (stop) command (616 in FIG. 6).

Afterward, the asynchronous connection is disconnected and then the isochronous connection is disconnected (617 and 618 in FIG. 6).

While there has been described the protocol between the digital television 120 and the DVC 100 in FIG. 6, the present invention is not limited to this. The tuner 110 that is another controlled device can communicate with the digital television 120 in the same manner as for this protocol. Furthermore, a communication between the digital television 120 and the DVC 100 can be executed in parallel with a communication between the digital television 120 and the tuner 110.

Next, the above GUI_UPDATE command, the USER_ACTION command, and the DIRECT_ACTION command will be described below. The control commands are transferred on the basis of the function control protocol stipulated in the IEC61883-1.

FIG. 7A shows a control command stipulated by the function control protocol and FIG. 7B shows a frame structure of a response corresponding thereto. "ctype" and "response" indicate a command type and a response type, respectively. The "subunit_type" and "subunit_ID" are used for specifying a sub-unit to be controlled. "opcode" indicates controlled contents and operand[1] to operand[n] are defined according to the contents of opcode.

(Description of GUI_UPDATE Command)

Referring to FIG. 8A, there is shown a diagram of assistance in explaining a command frame of the GUI_UPDATE command according to this embodiment. "source plug" is stored in operand[1] and "subfunction" indicating an instruction for the controlled device is stored in operand[3].

The content of "subfunction" is described below by using FIG. 8B. An "open" code is used for giving an instruction on a start of a remote operation with an operation panel (hereinafter, simply referred to as a remote operation). A "close" code is used for giving an instruction on an end of the remote operation.

A "start" code is used for giving an instruction on a start of transferring GUI data forming the operation panel. A "stop" code is used for giving an instruction on a stop of transferring the GUI data. The controlled device transmits GUI data depending upon changes in a device condition or in response to a result of an operation until this GUI_UPDATE (stop) command is received.

A "restore" code is used for giving an instruction on a return of an asynchronous connection after a bus reset occurs in the network 1. A "change" code is used for giving an instruction on a change of a display range of an operation panel.

(Description of Push_Gui_Data Command)

Referring to FIG. 9A, there is shown a diagram of assistance in explaining a command frame of the PUSH_GUI_DATA command according to this embodiment. A plug number obtained by the GUI_UPDATE (open) command is stored in operand[0]. An "indicator" is stored in operand[5]. Element IDs for identifying GUI elements are stored in operand [6] to operand[9].

The contents of the "indicator" will be described below by using FIG. 9B. The "indicator" comprises "level" and "with_data". A code is set to "level" for specifying a range of GUI data requested of the controlled device by the controller. If actual data (a text, an image, a sound, etc.) of the GUI element specified by using the element ID and "level", "1" is stored in "with_data".

The contents of "level" will be described by using FIG. 9C. An "itself" code is used for requesting the GUI element itself specified by the element ID. An "itself and next level" code is used for requesting the GUI element specified by the element ID and a GUI element belonging to the next level of the GUI element and an "all level" code is used for requesting all the GUI elements.

(Description of USER_ACTION Command)

Referring to FIG. 10, there is shown a diagram of assistance in explaining a command frame of a USER_ACTION command according to this embodiment. In operand[0], operand[3] to operand[6], operand[7], and operand[8] or after, "source_plug", "element_id", "action_type", and "data" are stored, respectively.

The "element_id" code is used for indicating an element ID for identifying an GUI element. The "action_type" code is used for specifying a user action such as a depression, a release, and a selection.

(Description of DIRECT_ACTION Command)

Referring to FIG. 11, there is shown a diagram of assistance in explaining a command frame of a DIRECT_ACTION command according to this embodiment. In operand [0], operand[2], and operand[3] or after, "action_code", "action_type", "action_data_length", and "action_specified_data" are stored, respectively.

The "action_code" code is used for indicating a specific function. The "action_type" code is used for indicating how a specific function is operated. The "action_data_length" code is used for indicating a data length of "action_specified_data". The "action_specified_data" code is used for indicating data inherent in the "action_code" code.

Referring to FIG. 12, there is shown a diagram of an example of the "action_code" code shown in FIG. 11.

If the currently selected operation panel is an operation panel of the DVC 100 in this embodiment, the "action_code" corresponding to the key 311 is "28h", which indicates rewinding of the storage medium 105, for example. The "action_code" corresponding to the key 312 is "24h", which indicates a start of reproduction of the storage medium 105. The "action_code" corresponding to the key 313 is "29h", which indicates fast-forwarding of the storage medium 105. The "action_code" corresponding to the key 314 is "25h", which indicates a stop of an operation of the storage medium 105. The "action_code" corresponding to the key 315 is "27h", which indicates a start of recording into the storage medium 105.

On the other hand, if the currently selected operation panel is an operation panel of the tuner 110, the "action_code" corresponding to the key 311 is "2Bh", which indicates a movement in a lower direction of a receiving channel. The "action_code" corresponding to the key 312 is "06h", which indicates a display of EPG (electric program guide). The "action_code" corresponding to the key 313 is "2Ch", which indicates a movement in an upper direction of the receiving channel.

(Description of Processing Procedure of Controlled Device)

Figure 13:
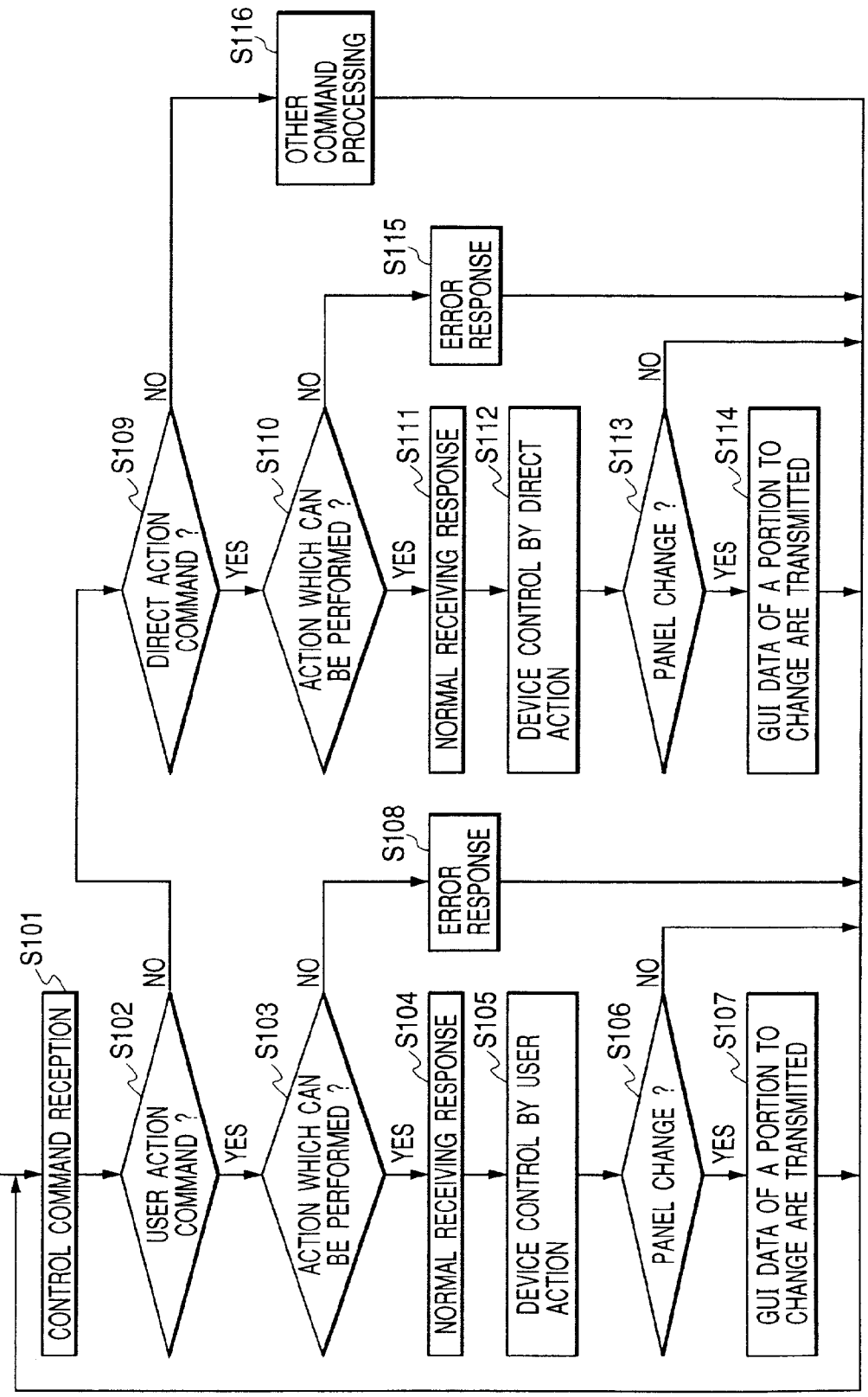
FIG. 13 is a diagram of assistance in explaining a processing procedure of a controlled device according to a preferred embodiment of the present invention.

Referring to FIG. 13, there is shown a diagram of assistance in explaining a processing procedure of a controlled device according to this embodiment. While a processing procedure of the DVC 100 that is one of the controlled devices is described here, the tuner 110 can also be processed as described below.

In step S101 the 1394 interface 101 receives a control command corresponding to a user remote control operation. This type of control commands include the above-described USER_ACTION command, the above-described DIRECT_ACTION command, and other control commands.

Next, in step S102, the control unit 102 determined whether the received control command is the USER_ACTION command. If it is the USER_ACTION command, step S103 and subsequent processing is executed; otherwise, step S109 and subsequent processing is executed.

In step S103, the control unit 102 checks contents of the received USER_ACTION command and determines whether it is an executable action. If it is executable, the control unit 102 executes processing of step S104; otherwise, the control unit 102 executes processing of step S108. In the step S108, an error response is generated for indicating that the received USER_ACTION command cannot be processed and the error response is returned to the controller.

In step S104, the 1394 interface 101 normally receives the USER_ACTION command and returns a response indicating that the command is executable to the controller.

Next, in step S105, the control unit 102 controls a function corresponding to an operation panel specified by the "element_id" code of the USER_ACTION command according to the "action_type" code of the USER_ACTION command.

In step S106, the control unit 102 determines whether the operation panel operated by the controller should be changed together with an execution of the USER_ACTION command. If it should be changed, processing of step S107 is executed; otherwise, the processing control returns to the step S101 to receive the next control command.

In the step S107, the 1394 interface 101 transmits the GUI data of a portion to change to the controller. Afterward, the controlled device returns to the step S101 to receive the next control command.

On the other hand, the control unit 102 determines whether the received control command is a DIRECT_ACTION command in step S109. If it is the DIRECT_ACTION command, step S110 and subsequent processing is executed; otherwise, step S116 and subsequent processing is executed. In step S116, processing corresponding to the received control command is executed and then the processing control returns to the step S101 to receive the next control command.

In the step S110, the control unit 102 checks contents of the received DIRECT_ACTION command and determines whether it is an executable action. If it is executable, the control unit 102 executes processing of step S111; otherwise, the control unit 102 executes processing of step S115. In the step S115, an error response is generated for indicating that the received DIRECT_ACTION command cannot be processed and the error response is returned to the controller.

In step S112, the 1394 interface 101 normally receives the DIRECT_ACTION command and returns a response indicating that the command is executable to the controller.

Next, in the step S112, the control unit 102 controls a function directly specified by the "action_code" code of the DIRECT_ACTION command according to the "action_type" code of the DIRECT_ACTION command.

In Step S113, the control unit 102 determines whether the operation panel displayed on the controller should be changed together with an execution of the DIRECT_ACTION command. If it should be changed, processing of step S114 is executed; otherwise, the processing control returns to the step S101 to receive the next control command.

In the step S114, the 1394 interface 101 transmits the GUI data of a portion to change to the controller. Afterward, the controlled device returns to the step S101 to receive the next control command.

In the above processing procedure, each controlled device can execute both of the USER_ACTION command and the DIRECT_ACTION command, and if an operation panel changes according to these control commands, GUI data of a portion corresponding to the change can be transmitted to the controller.

(Description of Processing Procedure of Controller)

Figure 14:
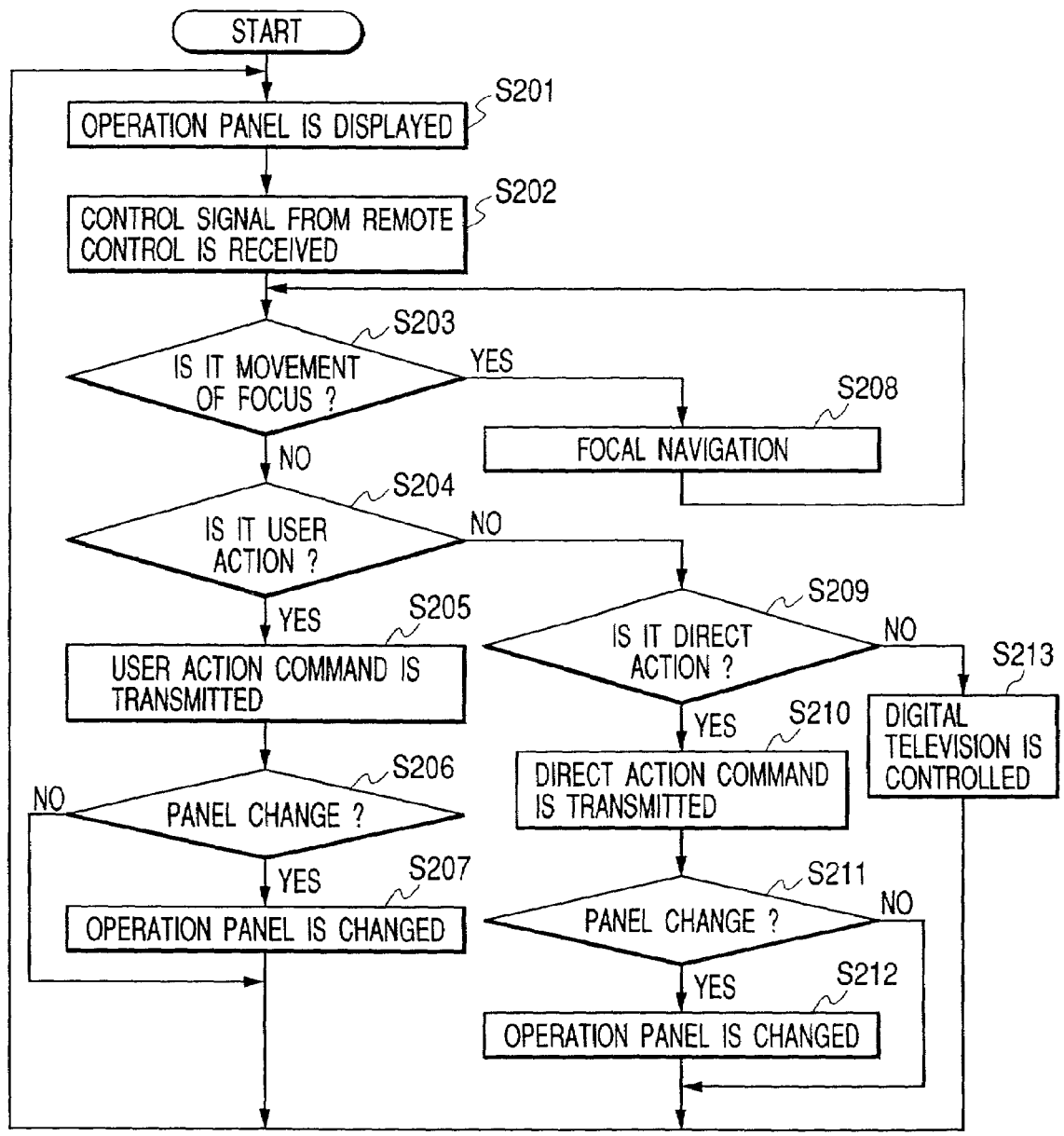
FIG. 14 is a diagram of assistance in explaining a processing procedure of a controller according to a preferred embodiment of the present invention.

Referring to FIG. 14, there is shown a diagram of assistance in explaining a processing procedure of the digital television 120 that is a controller according to this embodiment.

In step S201, the control unit 122 selects an operation panel to be operated according to a user remote control operation and displays the operation panel selected in accordance with the above-described protocol on the display unit 128.

In step S202, the remote control control unit 126 receives a control signal from the remote control 130.

In step S203, the control unit 122 checks the received control signal and determines whether it is an operation of a focus. If it is an operation of the focus, the above-described focal navigation is executed in step S208. Otherwise, processing of step S204 is executed.

In step S204, the control unit 122 checks the received control signal and determines whether it is an operation in the focus navigation mode. If it is an operation in the focus navigation mode, a USER_ACTION command corresponding to the received control signal is generated and processing of step S205 is executed. Otherwise, processing of step S209 is executed.

In step S205, the 1394 interface 121 issues the USER_ACTION command to a controlled device corresponding to the currently operated operation panel.

In step S206, the 1394 interface 121 determines whether the GUI data of a portion to change on the operation panel has been received. If the GUI data of a portion to change is received, the operation panel is changed on the basis of the GUI data in the step S206. If the operation panel is in the non-display condition at this time, the changed operation panel is displayed on the display screen until a user specifies the non-display condition or until a predetermined period of time elapses.

In step S209, the control unit 122 checks the received control signal and determines whether it is an operation in the direct action mode. If it is the operation in the direct action mode, the DIRECT_ACTION command corresponding to the received control signal is generated and processing of step S210 is executed. Otherwise, a control of the digital television 120 or the like is executed in step S213.

In the step S210, the 1394 interface 121 issues a DIRECT_ACTION command to a controlled device corresponding to the currently operated operation panel.

In step S211, the 1394 interface 121 determines whether GUI data of a portion to change on the operation panel has been received. If the GUI data of a portion to change is received, the operation panel is changed on the basis of the GUI data in step S212. If the operation panel is in the non-display condition at this time, the changed operation panel is displayed on the display screen until the user specifies the non-display condition or until a predetermined period of time elapses.

In the above-described processing procedure, the controller can remotely operate a controlled device using two operation methods together. In addition, if either of the operation methods is used for an operation, a result of the operation can be graphically expressed on the operation panel. Furthermore, the user can visually confirm which function of the controlled device has been actually operated, by which the current operating condition can always be grasped.

As set forth hereinabove, according to this embodiment, two operation methods of the focal navigation mode and the direct action mode are used together, by which it becomes possible to flexibly cope with operating environments for a plurality of types of electronic devices and to remotely operate these electronic devices in a simple operation procedure.

Furthermore, according to this embodiment, two operation methods of the focal navigation mode and the direct action mode are used together, by which a user can execute both of the first operation of selecting a desired function while viewing an operation panel and the second operation of directly selecting a desired function without operating an operation panel. This reduces a complication of an operation, thereby significantly improving facility in operation.

In addition, according to this embodiment, a plurality of operations can be continuously performed in a short time by using these two operation methods together.

Furthermore, according to this embodiment, results of operations in the two operation methods are always reflected on an operation panel, by which a user easily check what condition the operation is in at present so as to prevent the user from being confused.

Still further, according to this embodiment, a function corresponding to an operation key for realizing the direct action mode can be changed for each operation panel. This makes it possible to cope with various types of controlled devices flexibly without increasing the number of operation keys.

The invention may be embodied in other specific forms without departing from essential characteristics thereof.

For example, while the digital television 120 has been described as an example of a controller in this embodiment, the controller is not limited to the digital television. Only if it is an electronic device having an operation apparatus equivalent to the remote control 130 and a display, any device can be used for it.

In addition, while the DVC 100 and the tuner 110 have been described as examples of controlled devices in this embodiment, controlled devices are not limited to these devices. They can be either of audio-visual devices other than the DVC 100 and the tuner 110 (for example, a digital video recorder, a set-top box, etc.) and household electric appliances.

Therefore, the above-mentioned embodiments are merely examples in all respects, and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. A control system, comprising:
a control apparatus that receives an operation panel from a controlled apparatus, the operation panel including display elements used to control the controlled apparatus, the display elements including a specific display element used to control a specific function of the controlled apparatus; and
a remote control device having first and second operating units, the first operating unit being used to control the specific function of the controlled apparatus using the operation panel and the second operating unit being used to control the specific function of the controlled apparatus,
wherein said control apparatus includes (a) a receiving unit that receives a control signal from said remote control device, and (b) a control unit that (i) generates a first command if the control unit determines in accordance with the control signal that the specific display element in the operation panel is operated using the first operating unit, and (ii) generates a second command if the control unit determines in accordance with the control signal that the second operating unit is operated, the first and second commands being used to control the specific function of the controlled apparatus,
wherein the first command generated by the control unit is sent from said control apparatus to the controlled apparatus,
wherein the second command generated by the control unit is sent from said control apparatus to the controlled apparatus, and
wherein the control unit updates the operation panel using data sent from the controlled apparatus to said control apparatus in response to the second command so as to indicate that the specific function of the controlled apparatus is controlled, if the second command is sent from said control apparatus to the controlled apparatus.

2. A control system according to claim 1, wherein the control unit determines, according to the control signal, which of the display elements in the operation panel is operated.

3. A control system according to claim 1, wherein the control unit determines, according to the control signal, whether to move a cursor on the operation panel.

4. A control system according to claim 1, wherein the control unit determines whether to send the second command from said control apparatus to the controlled apparatus even if the operation panel is not displayed on a display unit.

5. A control apparatus comprising:
a first receiving unit that receives an operation panel from a controlled apparatus, the operation panel including display elements used to control the controlled apparatus, the display elements including a specific display element used to control a specific function of the controlled apparatus;
a second receiving unit that receives a control signal from a remote control device, the remote control device having first and second operating units, the first operating unit being used to control the specific function of the controlled apparatus using the operation panel and the second operating unit being used to control the specific function of the controlled apparatus; and
a control unit that (i) generates a first command if said control unit determines in accordance with the control signal that the specific display element in the operation panel is operated using the first operating unit, and (ii) generates a second command if said control unit determines in accordance with the control signal that the second operating unit is operated, the first and second commands being used to control the specific function of the controlled apparatus,
wherein the first command generated by said control unit is sent from said control apparatus to the controlled apparatus, wherein the second command generated by said control unit is sent from said control apparatus to the controlled apparatus, and wherein said control unit updates the operation panel using data sent from the controlled apparatus to said control apparatus in response to the second command so as to indicate that the specific function of the controlled apparatus is controlled, if the second command is sent from said control apparatus to the controlled apparatus.

6. A control apparatus according to claim 5, wherein said control unit determines, according to the control signal, which of the display elements in the operation panel is operated.

7. A control apparatus according to claim 5, wherein said control unit determines, according to the control signal, whether to move a cursor on the operation panel.

8. A control apparatus according to claim 5, wherein said control unit determines whether to send the second command from said control apparatus to the controlled apparatus even if the operation panel is not displayed on the a display unit.

9. A method of controlling a control apparatus, said method comprising the steps of:

receiving an operation panel from a controlled apparatus, the operation panel including display elements used to control the controlled apparatus, the display elements including a specific display element used to control a specific function of the controlled apparatus;

receiving a control signal from a remote control device, the remote control device having first and second operating units, the first operating unit being used to control the specific function of the controlled apparatus using the operation panel and the second operating unit being used to control the specific function of the controlled apparatus;

generating a first command if it is determined in accordance with the control signal that the specific display element in the operation panel is operated using the first operating unit;

generating a second command if it is determined in accordance with the control signal that the second operating unit is operated, the first and second commands being used to control the specific function of the controlled apparatus;

sending the first command from the control apparatus to the controlled apparatus if the first command is generated in said first generating step;

sending the second command from the control apparatus to the controlled apparatus if the second command is generated in said second generating step; and updating the operation panel using data sent from the controlled apparatus to the control apparatus in response to the second command so as to indicate that the specific function of the controlled apparatus is controlled, if the second command is sent from the control apparatus to the controlled apparatus.

10. A method according to claim 9, further comprising the step of:

determining, according to the control signal, which of the display elements in the operation panel is operated.

11. A method according to claim 9, further comprising the step of:

determining, according to the control signal, whether to move a cursor on the operation panel.

12. A method according to claim 9, further comprising the step of:

determining whether to send the second command from the control apparatus to the controlled apparatus even if the operation panel is not displayed on a display unit.

* * * * *